(12) United States Patent
Nurmi

(10) Patent No.: US 9,043,732 B2
(45) Date of Patent: May 26, 2015

(54) APPARATUS AND METHOD FOR USER INPUT FOR CONTROLLING DISPLAYED INFORMATION

(75) Inventor: Mikko Nurmi, Tampere (FI)

(73) Assignee: Nokia Corporation, Espoo (FI)

(*) Notice: Subject to any disclaimer, the term of this patent is extended or adjusted under 35 U.S.C. 154(b) by 493 days.

(21) Appl. No.: 12/909,499

(22) Filed: Oct. 21, 2010

(65) Prior Publication Data

US 2012/0102436 A1 Apr. 26, 2012

(51) Int. Cl.
*G06F 3/033* (2013.01)
*G06F 1/16* (2006.01)
*G06F 3/041* (2006.01)
*G06F 3/0488* (2013.01)

(52) U.S. Cl.
CPC .............. *G06F 1/1613* (2013.01); *G06F 3/041* (2013.01); *G06F 3/0488* (2013.01); *G06F 2203/04101* (2013.01); *G06F 2203/04808* (2013.01)

(58) Field of Classification Search
CPC ............ G06F 1/1613; G06F 2203/04101; G06F 2203/04808; G06F 3/041; G06F 3/0488
USPC ......... 715/863, 782, 766, 848, 850, 852, 702; 348/51; 345/419, 653, 654, 664, 665, 345/679, 680
See application file for complete search history.

(56) References Cited

U.S. PATENT DOCUMENTS

| 7,508,377 B2 | 3/2009 | Pihlaja et al. | |
|---|---|---|---|
| 2007/0211023 A1 | 9/2007 | Boillot | |
| 2008/0089587 A1* | 4/2008 | Kim et al. | 382/190 |
| 2008/0120568 A1 | 5/2008 | Jian et al. | |
| 2009/0058829 A1* | 3/2009 | Kim et al. | 345/173 |
| 2009/0070711 A1* | 3/2009 | Kwak et al. | 715/829 |
| 2009/0167882 A1* | 7/2009 | Chen et al. | 348/222.1 |
| 2009/0201260 A1* | 8/2009 | Lee et al. | 345/173 |
| 2009/0231244 A1* | 9/2009 | Lee | 345/76 |
| 2009/0237421 A1* | 9/2009 | Kim et al. | 345/661 |
| 2009/0239588 A1* | 9/2009 | Nam | 455/566 |
| 2009/0265669 A1 | 10/2009 | Kida et al. | |
| 2009/0325643 A1* | 12/2009 | Hamadene et al. | 455/566 |
| 2010/0033479 A1 | 2/2010 | Hirayama et al. | |

(Continued)

FOREIGN PATENT DOCUMENTS

| EP | 2068235 A2 | 6/2009 |
|---|---|---|
| EP | 2 144 448 A1 | 1/2010 |

(Continued)

OTHER PUBLICATIONS

Benko, H., *Beyond Flat Surface Computing: Challenges of Depth-Aware and Curved Interfaces*, MM'09, Beijing, China (2009), 10 pages.

(Continued)

*Primary Examiner* — Weilun Lo
*Assistant Examiner* — Rashedul Hassan
(74) *Attorney, Agent, or Firm* — Alston & Bird LLP

(57) ABSTRACT

In accordance with an example embodiment of the present invention, a method for proximity based input is provided, comprising: detecting presence of an object in close proximity to an input surface, detecting a displayed virtual layer currently associated with the object on the basis of distance of the object to the input surface, detecting a hovering input by the object, and causing a display operation to move at least a portion of the associated virtual layer in accordance with the detected hovering input.

20 Claims, 6 Drawing Sheets

(56) References Cited

U.S. PATENT DOCUMENTS

| | | | |
|---|---|---|---|
| 2010/0053151 A1 | 3/2010 | Marti et al. | |
| 2010/0053304 A1* | 3/2010 | Underkoffler et al. | 348/42 |
| 2010/0056220 A1* | 3/2010 | Oh et al. | 455/566 |
| 2010/0058182 A1* | 3/2010 | Jung | 715/702 |
| 2010/0060570 A1* | 3/2010 | Underkoffler et al. | 345/156 |
| 2010/0060576 A1* | 3/2010 | Underkoffler et al. | 345/158 |
| 2010/0093410 A1* | 4/2010 | Cho et al. | 455/575.4 |
| 2010/0095206 A1 | 4/2010 | Kim | |
| 2010/0100842 A1* | 4/2010 | Kim | 715/808 |
| 2010/0105364 A1* | 4/2010 | Yang | 455/414.1 |
| 2010/0110025 A1* | 5/2010 | Lim | 345/173 |
| 2010/0110384 A1 | 5/2010 | Maekawa | |
| 2010/0141784 A1* | 6/2010 | Yoo | 348/222.1 |
| 2010/0182248 A1* | 7/2010 | Chun | 345/173 |
| 2010/0225564 A1 | 9/2010 | Tomisawa et al. | |
| 2010/0245345 A1 | 9/2010 | Tomisawa et al. | |
| 2010/0281440 A1* | 11/2010 | Underkoffler et al. | 715/863 |
| 2010/0315413 A1* | 12/2010 | Izadi et al. | 345/419 |
| 2010/0328438 A1* | 12/2010 | Ohyama et al. | 348/51 |
| 2011/0035691 A1* | 2/2011 | Kim | 715/765 |
| 2011/0065478 A1* | 3/2011 | Kim et al. | 455/566 |
| 2011/0096024 A1* | 4/2011 | Kwak | 345/174 |
| 2011/0164029 A1* | 7/2011 | King et al. | 345/419 |
| 2011/0179368 A1* | 7/2011 | King et al. | 715/769 |
| 2012/0212429 A1* | 8/2012 | Okura et al. | 345/173 |

FOREIGN PATENT DOCUMENTS

| | | | |
|---|---|---|---|
| GB | 2462171 A | 2/2010 | |
| JP | 2004-280496 A | 10/2004 | |
| JP | 2008-219788 A | 9/2008 | |
| KR | 2010-0027976 A | 3/2010 | |
| KR | 2010-0041006 A | 4/2010 | |
| KR | 2010 0099828 A | 9/2010 | |
| WO | WO 2008/111495 A1 | 9/2008 | |
| WO | WO 2009/024971 A2 | 2/2009 | |
| WO | WO 2011/161310 A1 | 12/2011 | |

OTHER PUBLICATIONS

Hilliges, O. et al., *Interactions in the air: Adding Further Depth to Interactive Tabletops*, UIST '09, Victoria, BC, Canada, (2009) pp. 139-148.

International Search Report for Application No. PCT/FI2011/050866 dated Mar. 6, 2012.

Hirata, Y. et al., *3-Dimensional Interface Device for Virtual Work Space*, IEEE/RSJ, IEEE (1992) 889-896.

Office Action for Russian Application No. 2013123025 dated Aug. 29, 2014.

International Preliminary Report on Patentablility/Written Opinion for Application No. PCT/FI2011/050866 dated Apr. 23, 2013.

Subramanian et al., "Multi-Layer Interaction for Digital Tables," *Proceedings of the $19^{th}$ Annual ACM Symposium on User Interface Software and Technology (UIST '06)*, Oct. 15-18, 2006, Montreux, Switzerland, pp. 269-272.

Extended European Search Report and Opinion from related EP Appl. No. 11833916.7, dated Mar. 19, 2014.

Office Action for Korean Application No. 10-2013-7012833 dated Mar. 24, 2014.

Office Action for European Application No. 11 833 916.7 dated Feb. 23, 2015.

* cited by examiner

APPARATUS AND METHOD FOR USER INPUT FOR CONTROLLING DISPLAYED INFORMATION

FIELD

The present invention relates to an apparatus and a method for user input for controlling displayed information.

BACKGROUND

Touch screens are widely used in many portable electronic devices, for instance in PDA (Personal Digital Assistant) devices, tabletops, touch surfaces, and mobile devices. Touch screens are operable by a pointing device (or stylus) and/or by a finger. Typically the devices also comprise conventional buttons for certain operations.

3D displays capable of displaying stereoscopic images have been developed also for portable and handheld devices. Stereoscopic displays may be used to display UI items perceived by the user as three-dimensional (3D) images. The introduction of 3D displays also brings new challenges and possibilities for user interaction design.

SUMMARY

Various aspects of examples of the invention are set out in the claims.

According to an aspect, an apparatus is provided, comprising at least one processor; and at least one memory including computer program code, the at least one memory and the computer program code configured to, with the at least one processor, cause the apparatus at least to perform: detect presence of an object in close proximity to an input surface, detect a displayed virtual layer currently associated with the object on the basis of distance of the object to the input surface, detect a hovering input by the object, and cause a display operation to move at least a portion of the associated virtual layer in accordance with the detected hovering input.

According to an aspect, a method is provided, comprising: detecting presence of an object in close proximity to an input surface, detecting a displayed virtual layer currently associated with the object on the basis of distance of the object to the input surface, detecting a hovering input by the object, and causing a display operation to move at least a portion of the associated virtual layer in accordance with the detected hovering input.

According to an example embodiment, the distance of the at least a portion of the layer to the input surface is adapted in accordance with the hovering input.

According to another example embodiment, a change of display mode between two-dimensional and three-dimensional modes is detected on the basis of the detected hovering input, and display of two-dimensional or three-dimensional view is controlled in accordance with the detected change of display mode.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1A:
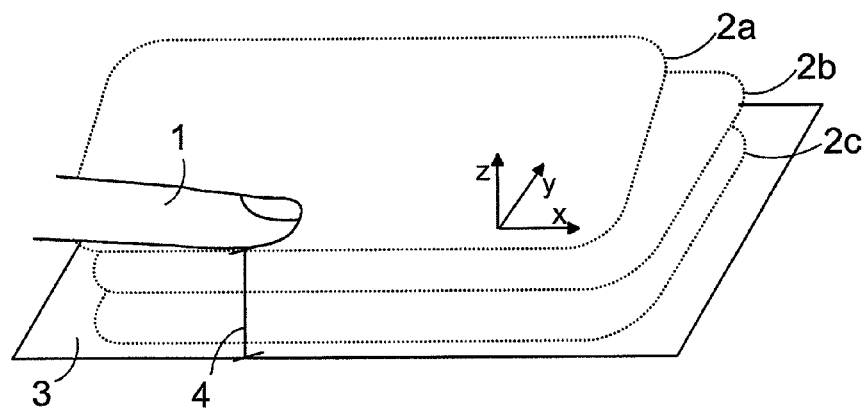
FIGS. 1a and 1b illustrate manipulation of virtual layers according to an example embodiment.

FIG. 1a illustrates display of virtual layers 2a, 2b, 2c of virtual three-dimensional space. The virtual layers 2a-2c may be displayed by a stereoscopic display to appear to be positioned on top of a display surface 3. A virtual layer refers generally to a level or view, among a set of layered or stacked 3D levels or views which may be at least partially overlapping. The virtual layer may also be referred to as a 3D layer and considered to contribute to the displayed 3D space illusion. The virtual layer may cover only a portion of a display area, and separate virtual layers may be applied to cover different areas of the display. A virtual layer may display a plurality of 2D and/or 3D graphical user interface (GUI) items, which may be at least partially transparent. It will be appreciated that virtual layers may have various forms, and in some embodiments their shape can be modified by the user.

In example embodiments hovering is used to control appearance and/or position of one or more virtual layers 2a-c. Hovering refers generally to introduction of an input object 1, such as a finger or a stylus, in close proximity to, but not in contact with, an input surface 3, such as an input surface of a touch screen. Amongst displayed virtual layers 2a-c of a 3D view, a layer 2a currently associated with the object may be detected on the basis of distance 4 of the object 1 to the input surface 3. This is to be understood broadly, and may include detection based on specifically estimated distance value or based on a signal value dependent on the distance of the object, for example.

A display operation to cause illustrated movement of at least a portion of the associated virtual layer may be controlled in accordance with a detected hovering input. A hovering input associated with a virtual layer 2a may be detected merely based on sensed movement of the input object 1 associated with the virtual layer, or some further particular gesture by the input object may be required, for instance. These features enable many intuitive interaction options to manipulate 3D display views by utilizing the space above the input surface 3. Virtual layers may be visualized to react to real life objects, such as a user's finger, enabling to strengthen the 3D sensation for the user.

Figure 1B:
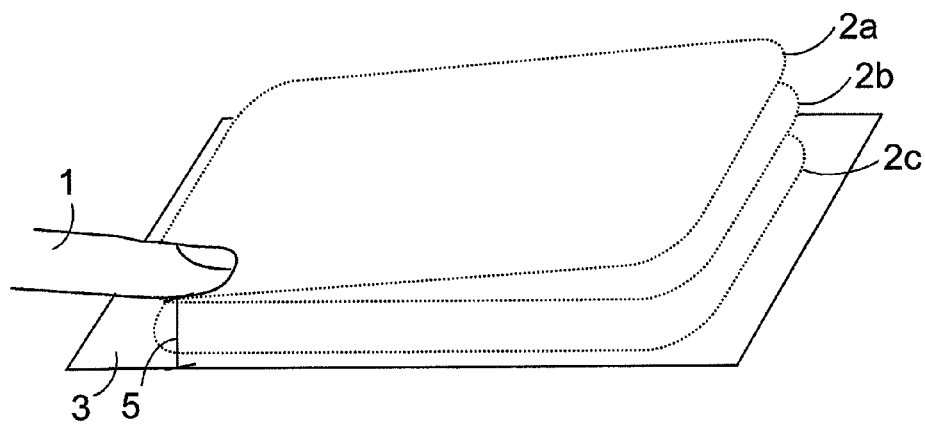

As indicated in the example of FIG. 1b, the associated layer 2a may be manipulated on the basis of further finger movement detected as the hovering input, by changing the orientation of the associated layer 2a and bringing the layer closer 5 to another layer 2b, for example.

Figure 2:
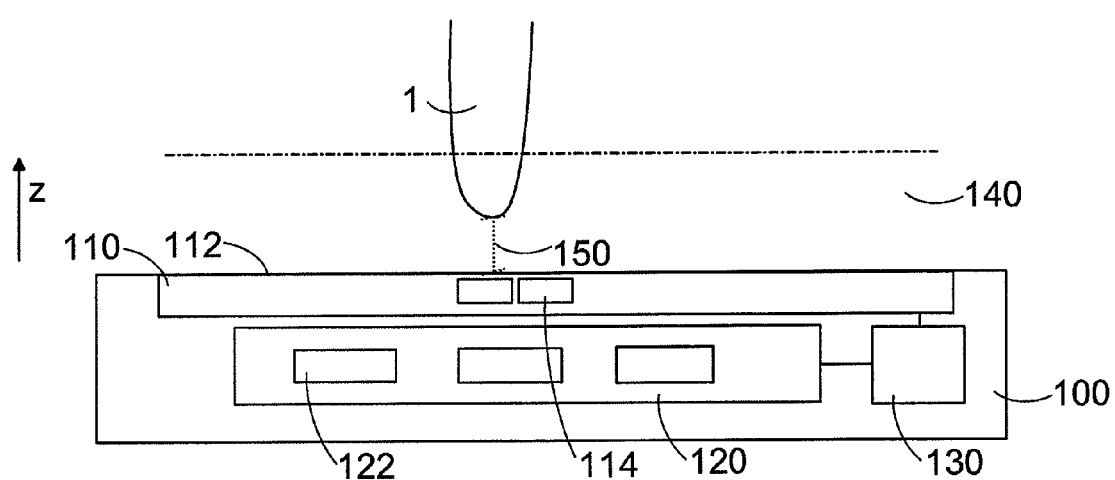
FIG. 2 is a simplified block diagram of a side view of an apparatus in accordance with an example embodiment of the invention.

FIG. 2 illustrates an example apparatus 100 in which the hovering based virtual layer control may be provided. The apparatus 100 may be a peripheral device or integrated in an electronic device. Examples of electronic devices include any consumer electronics device like computers, media players, wireless communications terminal devices, and so forth.

The apparatus 100 comprises a proximity detection system or unit 120 configured to detect when an input object 1 is brought in close proximity to, but not in contact with, an input surface 112. The input surface 112 may be a surface of a touch screen or other input device of the apparatus capable of detecting user inputs.

A sensing area 140, which may also be referred to as a hovering area, may illustrate the approximate area and/or distance at which a hovering input object 1 and hovering inputs are detected. A user input, such as a particular detected gesture, in the hovering area 140 detected at least partly based on the input object 1 not touching the input surface 112 may be referred to as a hovering input. Such hovering input is associated with at least one function, for instance selection of an UI item, selection of a virtual layer, zooming a display area, activation of a pop-up menu, modification of a UI item or virtual layer, or moving a virtual layer. The hovering input object 1 and hovering inputs may be detected on the basis of a sensing signal or the distance 150 of the input object 1 to the input surface 112 meeting a predefined threshold value. In some embodiments the hovering area 140 enables also inputting and/or accessing data in the apparatus 100, even without touching the input surface 112.

In some embodiments the detection system 120 generates a sensing field by one or more proximity sensors 122. In one example embodiment a capacitive proximity detection system is applied, whereby the sensors 122 are capacitive sensing nodes. Disturbances by one or more input objects 100 in the sensing field are monitored and presence of one or more objects is detected based on detected disturbances. A capacitive detection circuit 120 detects changes in capacitance above the surface of the touch screen 110.

However, it will be appreciated that the present features are not limited to application of any particular type of proximity detection. The proximity detection system 120 may be based on infrared proximity detection, optical shadow detection, acoustic emission detection, ultrasonic detection, or any other suitable proximity detection technique. For instance, in case the proximity detection system 120 would be based on infrared detection, the system would comprise one or more emitters sending out pulses of infrared light. One or more detectors would be provided for detecting reflections of that light from nearby objects 100. If the system detects reflected light, then an input object is assumed to be present.

The detection system 120 may be arranged to estimate (or provide a signal enabling estimation of) the distance of the input object 1 from the input surface 112, which enables to provide z coordinate data of the location of the object 1 in relation to the input surface 112. The proximity detection system 120 may also be arranged to generate information on x, y position of the object 1 in order to be able to determine a target UI item or area of a hovering input. X and y directions are generally substantially parallel to the input surface 112, and the z direction is substantially normal to input surface 112. Depending on the proximity detection technique applied, the size of the apparatus 100 and the input surface 112, and the desired user interaction, the hovering area 140 may be arranged to extend from the input surface 112 by distance selected from some millimeters to even up to multiple dozens of centimeters, for instance. The proximity detection system 120 may enable detection of also further parts of user's hand, and the system may be arranged to recognize false inputs and avoid further actions.

Virtual layers may be displayed in the hovering area 140 by a display 110. In some embodiments, a proximity detection system 120 is provided in an apparatus comprising a touch screen display. Thus, the display 110 may be a touch screen display comprising a plurality of touch sensitive detectors 114 to sense touch inputs to the touch screen input surface.

The apparatus 100 may comprise a stereoscopic display capable of displaying stereoscopic views. The stereoscopic display may be arranged to generate 3D image(s) on one or more virtual layers, such as virtual layers 2a-c as illustrated in FIGS. 1a and 1b. The stereoscopic display may direct information from certain sub-pixels of an image in different directions, so that a viewer can see a different picture with each eye. If the pictures are similar enough, the human brain will assume that the viewer is looking at a single object and fuse matching points on the two pictures together to create a perceived single object. The data for a 3D image may be obtained for instance by taking multiple two-dimensional images and by combining the pixels of the images to sub-pixels of a single image for the presentation on the stereoscopic display. In one alternative, two cameras that are arranged at a small pre-specified distance relative to each other take the two-dimensional images for a 3D presentation. Each camera may comprise an image chain applying an image processing to the captured images. The stereoscopic display system may also comprise a user imaging device and eye location tracking functionality. The display 110 may have specific 2D and 3D modes, and the system is able to switch between those modes. Depending on desired implementation and applied stereoscopic display technology, the display 110, which in some embodiments is a touch screen, may be arranged to provide stereoscopic display features, or elements of the stereoscopic display may be at least partly separate from the touch-screen display 110 (not specifically shown in FIG. 2). In one embodiment the stereoscopic display is an autostereoscopic display and the virtual layers are autostereoscopic views, which refers generally to a stereoscopic presentation of an UI item not requiring specific glasses for the user. Various autostereoscopic displays may be applied, for example autostereoscopic displays based on parallax barriers and/or lenticular lenses or applying holography and/or eye-tracking.

The proximity detection system 120 is coupled to a controller 130. The proximity detection system 120 is configured to provide the controller 130 with signals when an input object 1 is detected in the hovering area 140. Based on such input signals, commands, selections and other types of actions may be initiated, typically causing visible, audible and/or tactile feedback for the user. Touch inputs to the touch sensitive detectors 114 may be signalled via a control circuitry to the controller 130, or another controller.

The controller 130 may also be connected to one or more output devices, such as a touch screen display with 3D display features and/or a separate 3D display unit. The controller 130 may be configured to control different application views on the display 110. The controller 130 may detect touch inputs and hovering inputs on the basis of the signals from the proximity detection system 120 and the touch sensitive detectors 114. The controller 130 may then control a display function associated with a detected touch input or hovering input. Further, the controller 130 may be arranged to detect a virtual layer currently associated with the hovering object 1, and cause a display operation to move at least a portion of the associated layer in accordance with a detected hovering input.

Some examples of further features, which may at least partially be carried out by the controller 130, are illustrated below. It will be appreciated that the controller 130 functions may be implemented by a single control unit or a plurality of control units.

It will be appreciated that the apparatus 100 may comprise various further elements not discussed in detail herein. Although the apparatus 100 and the controller 130 are depicted as a single entity, different features may be implemented in one or more physical or logical entities. For instance, there may be provided a chip-set apparatus configured to carry out the control features of the controller 130. There may be further specific functional module(s), for instance for carrying out one or more of the blocks described in connection with FIGS. 3, 4, 8 and 14. In one example variation, the proximity detection system 120 and the input surface 112 are positioned apart from the display 110, e.g. on a side or back (in view of the position of a display) of a handheld electronic device.

Figure 3:
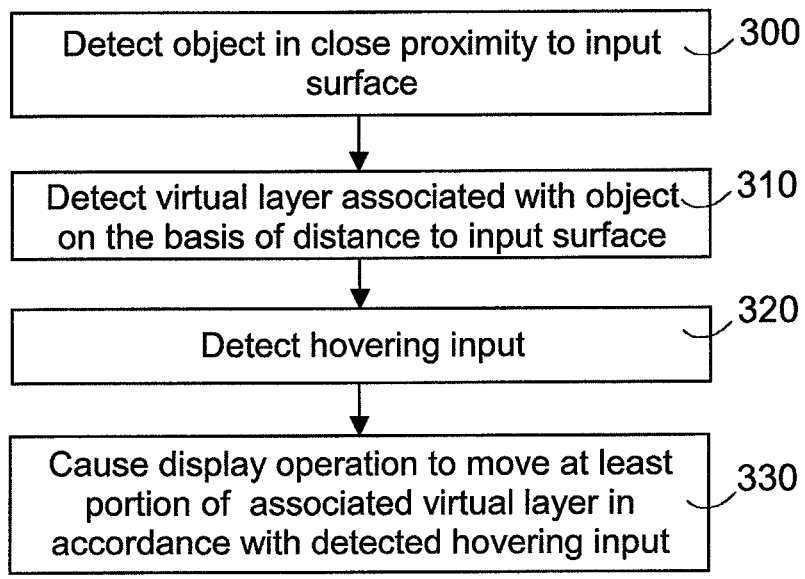
FIGS. 3 and 4 illustrate methods according to example embodiments of the invention.

FIG. 3 shows a method for controlling manipulation of virtual layers based on hovering according to an example embodiment. The method may be applied as a control algorithm by the controller 130, for example.

A presence of an object in close proximity to an input surface is detected 300. Amongst at least two virtual layers of a stereoscopic display, a layer currently associated with the object is detected 310 on the basis of distance of the object to the input surface.

A hovering input by the object is detected 320. It is to be appreciated that the hovering input and the currently associated layer may be detected substantially at the same time, or the user may perform the hovering input only some time after block 310. Furthermore, in one example variation of FIG. 3, the associated layer is detected after detection (320) of a hovering input.

A display operation to move at least a portion of the associated layer is caused 330 in accordance with the detected hovering input. Referring also to the example of FIG. 1, the apparatus 100 may thus be arranged to adapt the display to illustrate the selected layer 2a to move in one or more of the directions x, y, z. For example, the relative distance of the at least a portion of the layer 2a to the input surface is adapted in accordance with the hovering input. Thus, the virtual layers may be arranged to react to finger movement, and the user may be provided with a sensation of the layer moving with the finger. Various actions for the selected layer may be associated with movement of the object 1 in one or more of the directions x, y, z. Some further examples are illustrated below.

The apparatus 100 may be configured to detect hovering gesture(s). In one example embodiment, the apparatus is in block 320 configured to detect a hovering gesture associated with at least one virtual layer 1a. The selection and/or illustration of movement of the at least portion of the layer may be controlled 330 in accordance with the hovering gesture. For example, the apparatus 100 may be arranged to detect a rotation or double-click feature associated with a virtual layer.

Figure 4:
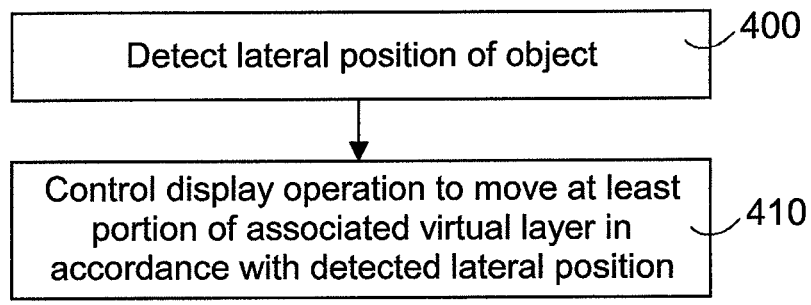

In some example embodiments, as illustrated in FIG. 4, the apparatus 100 is configured to detect 400 the lateral position of the object 1 in x, y directions parallel to the input surface 3. The movement of at least a portion of the layer may be controlled 410 in accordance with the detected lateral position. FIGS. 1a, 1b, 5, 6, 7a, and 7b illustrate some examples in which the x, y position of the object affects the visualized movement of the associated virtual layer.

Figure 5:
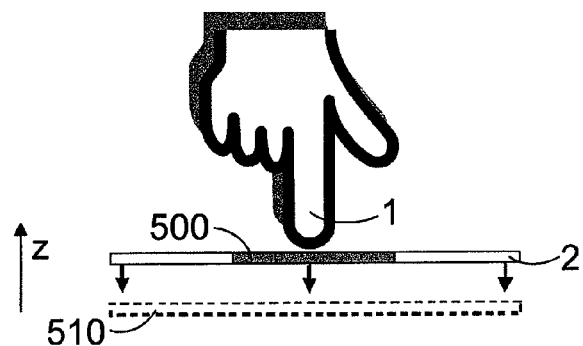
FIGS. 5 and 6 illustrate side views of adapting appearance of virtual layers on the basis of hovering inputs according to some example embodiments of the invention.

For example, with reference to FIG. 5, when the hovering movement is detected within the central portion 500 of the layer 2, the entire layer is selected and a display operation is controlled to illustrate 510 movement of the entire layer 2 towards the input surface. In one embodiment, a layer 2a may be moved by a hovering action selecting the entire layer towards another layer 2b, and the layers may be brought to the same level. The apparatus 100 may also be arranged to visualize separation of 3D views to different levels by a reverse hovering input.

Figure 6:
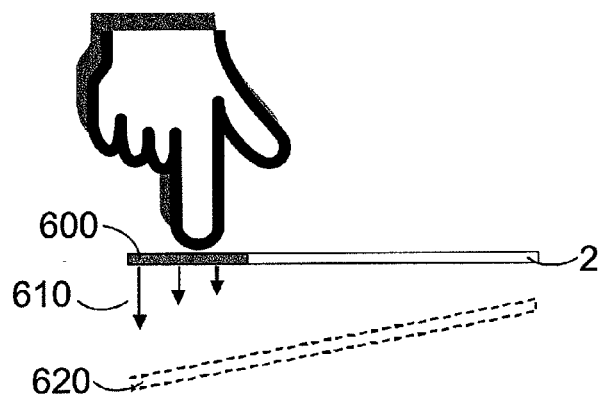
Figure 7A:
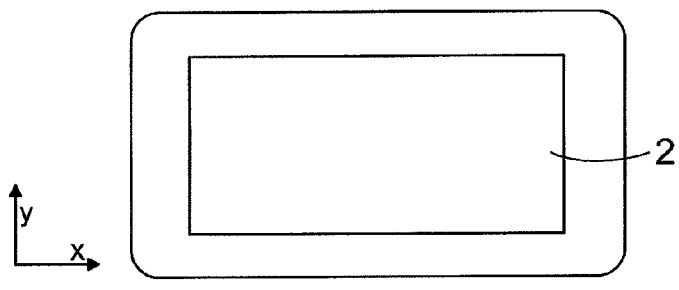
FIGS. 7a and 7b illustrate top views of adapting appearance of virtual layer according to an example embodiment.
Figure 7B:
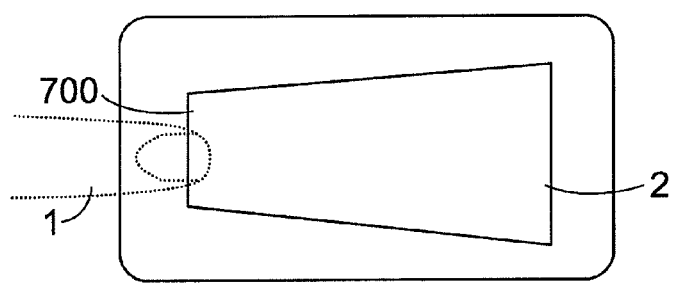

In one example embodiment, as illustrated in FIGS. 6, 7a and 7b, the apparatus 100 is configured to cause a portion of the layer 2 to approach 610, 620 the input surface. Further, a tilt operation 700 may be arranged for the layer 2 on the basis of the detected lateral position 600 of the object. For example, the layer 2 may provide a 3D city map view. In response to the finger hovering towards the input surface from one side of the layer 2, the map view may be tilted from one side and the map may be horizontally scrolled, thus enabling the user to very easily change the map view orientation and to also see more of the map as tilting reveals more map area.

It will be appreciated that a portion or the entire layer 2 could be selected and visualized to move away from the input surface 3, 112 to facilitate a sensation of the layer following a receding object.

Figure 8:
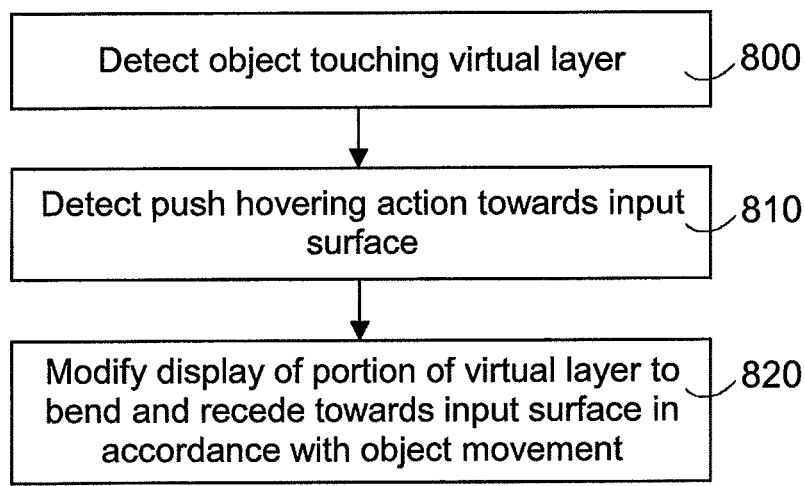
FIG. 8 illustrates a method according to an example embodiment.
Figure 10:
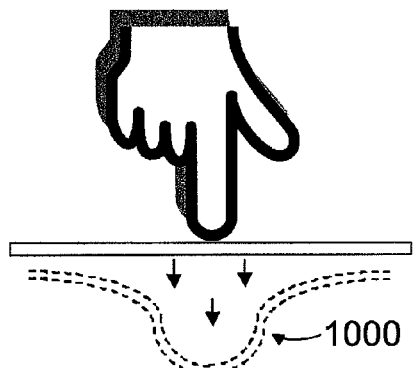

In another example embodiment, as illustrated in FIG. 8, the apparatus 100 is configured to detect 800 the object to virtually touch a portion of a virtual layer. In response to detecting a push hovering action, i.e. the object to approach 810 the input surface after detecting the virtual touch, the apparatus may be configured to adapt 820 the form of at least a portion of the layer. The form of the (portion of) the layer may be adapted to mimic a response to the object pushing the at least a portion of the layer. Thus, the layer may be visualized to bend and partially recede towards the input surface, as illustrated in FIG. 10, for example.

Various actions may be associated with the movement of the entire or a partial virtual layer 2. As some further examples, a zoom, rotation, or stretch operation may be performed for the virtual layer hovered by the user. In a still further example, virtual layers 2a-2c may be reordered by selecting an entire layer and moving it in relation to other layer(s).

In some example embodiments, the apparatus 100 is configured to control (330) virtual layer display operations on the basis of further properties associated with movement of the input object 1 in the hovering area 140.

Figure 9:
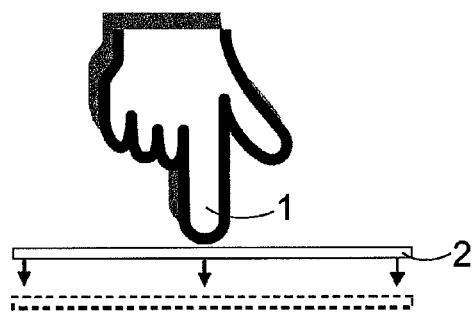
FIGS. 9, 10, 11a, 11b, 12, and 13 illustrate side views of adapting appearance of virtual layers on the basis of hovering inputs according to some example embodiments.

In one further example embodiment, the apparatus 100 is configured to estimate speed of movement of the object 1, and select the display operation for adapting (330) the layer appearance in accordance with the detected speed. There may be one or more threshold parameters affecting the selection of the display operation to be dependent on the speed of movement of the object. For example, in FIG. 9 the finger 1 may be approaching the input surface slowly, whereby the display is updated to visualize movement of the entire layer 2. In the example of FIG. 10 the finger may be approaching the input surface more quickly (e.g. above a given speed threshold value), and the layer 2 may be visualized to bend 1000 in response to the faster hovering action.

In some example embodiments, the input surface 3 and a display displaying the virtual layers are arranged at opposite sides of a handheld electronic device. For example, the input surface may be provided at the back cover of a handheld electronic device. The proximity detection system may be arranged to detect user hovering inputs at the backside, and the user may control the virtual layers by hovering actions without fingers obstructing the 3D view. In another example, the apparatus 100 may be arranged to support hovering inputs from both sides of the device, even simultaneously. For example, the user could thus use fingers on both sides of the device simultaneously to control virtual layers visualized in front the display and also behind it.

Figure 11A:
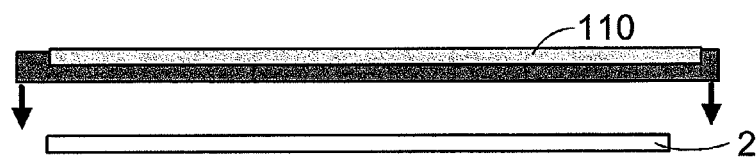
Figure 11A:
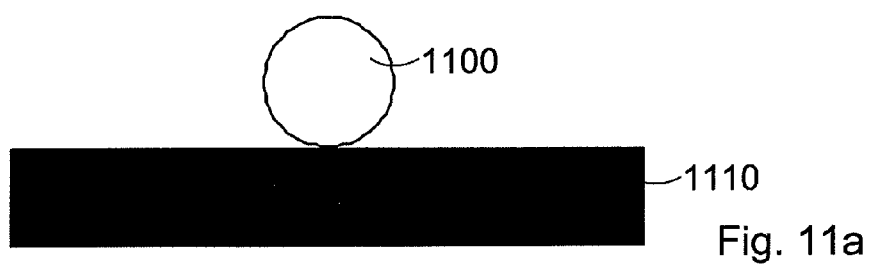
Figure 11B:
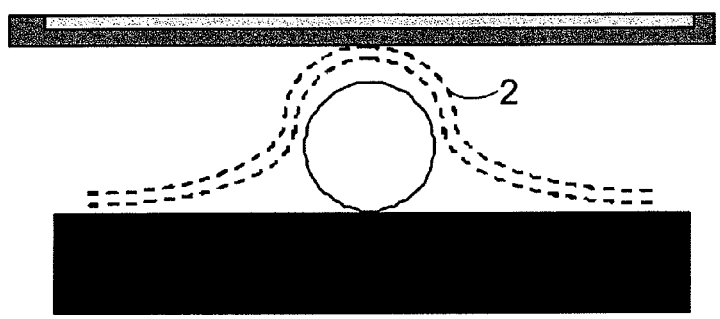

In one example embodiment, the virtual layer is visualized to extend or locate in the back of the electronic device (in view of the display in front of the device). As illustrated in the example of FIG. 11a, the virtual layer 2 could be visualized to locate at back side of the device. The proximity detection system may be arranged to detect objects at the back of the device and the virtual layer to approach an object 1100 on a surface 1110. As illustrated in the example of FIG. 11b, in response to the device further approaching the surface, at least a portion of the virtual layer is moved and thus the appearance of the virtual layer is adapted to react to the object 1100 virtually touching the virtual layer. For example, the position of the object 1100 may be detected and the associated area of the virtual layer 2 may be visualized to bend.

Figure 12:
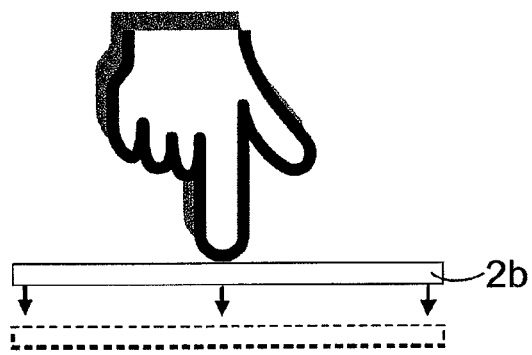
Figure 13:
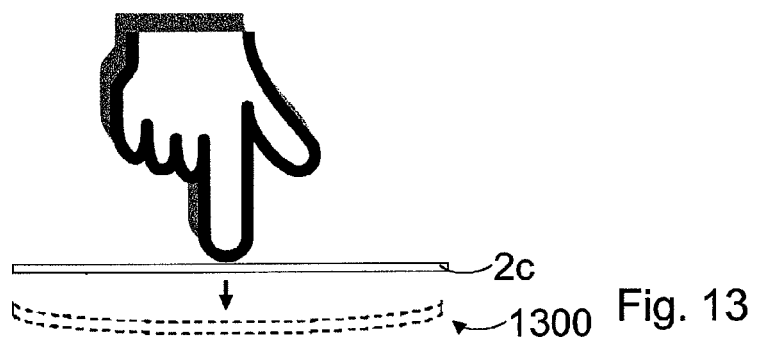

In some example embodiments, the movement and/or appearance of the at least a portion of the layer 2a-c is controlled in accordance with one or more physical properties associated with the layer or one or more graphical user interface items of the layer. In one embodiment different layers 2a-c may be associated with different thicknesses, and the visualized layer adaptation to hovering inputs may be dependent on the thickness. For example, referring to FIG. 12, a hovering input to push a layer 2b associated with larger thickness value results in illustration of the layer moving without changing its form. However, in the example of FIG. 13, in response to a similar hovering input associated with a layer 2c with smaller thickness value, the layer 2c is visualized to bend 1300.

In another example embodiment, the virtual layer 2a-c may be associated with a particular material, one or more properties being associated with the material. Hence, virtual layers may be associated with different specific weights, bending properties, and/or stretching properties etc. The display operation in block 330 of FIG. 3 may be selected on the basis of the properties of the layer in question.

In some example embodiments, a change of display mode between 2D and 3D modes is detected on the basis of a hovering input associated with one or more layers 2a-c. The apparatus 100 may be configured to control a change of display to 2D or 3D view in accordance with the detected hovering input.

Figure 14:
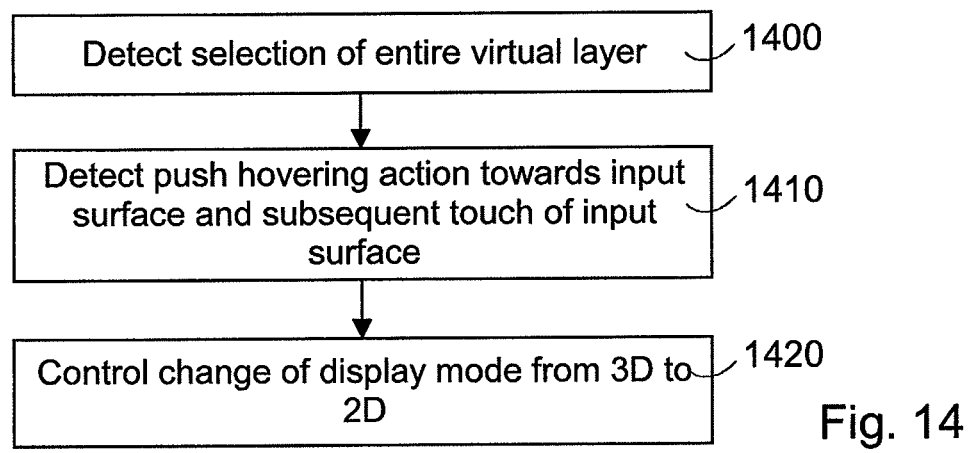
FIG. 14 illustrates a method according to an example embodiment.

In one example embodiment, as illustrated in FIG. 14, the apparatus 100 is configured to detect 1400 selection of the entire layer, e.g. in response to detecting the object to virtually touch the in the central portion of the layer. In response to detecting 1410 a push hovering action towards (and in one embodiment subsequent touch of) the input surface, such as a touch screen, change of display mode from 3D mode to 2D mode is controlled 1420. The user may then make inputs solely by touching the display. This provides an intuitive way for a user to switch 3D mode on or off. Also a change from 2D to 3D may be triggered at least partly on the basis of a hovering input. For example, when the user raises his finger of the display surface, the virtual layers are displayed. Similar display operations may be arranged when the apparatus 100 is laid down on a surface (virtual layers are flattened) and is raised off the surface).

In some example embodiments, properties of the input object(s) 1 associated with the detected hovering input are determined and they may be applied for controlling display operations in step 330. For example, the apparatus 100 may be arranged to detect if a palm of a hand is brought to the hovering area, and a display operation different from that associated with a finger may be controlled. In a further example, the virtual layers may be removed (and the display mode may be changed to 2D mode) only when the palm is sensed to approach the input surface. Thus, the size of the object may be used for adapting appearance of the virtual layer in response to hovering.

The proximity detection system 120 may be arranged to detect a simultaneous or combined use of two or more objects 1. In one example embodiment, the associated layer and/or the hovering input is detected in response to detecting two or more fingers hovering above the input surface. In another example, the appearance of the virtual layer 2a-c may be modified simultaneously by two or more fingers.

In one embodiment, different hovering functions are assigned to (at least two) different fingers. The apparatus 100 may then be arranged to support finger recognition, for example on the basis of information available from the proximity detection system and/or further sensor(s). For example, two hovering fingers may cause the virtual layer 2 to bend more than a similar hovering movement with one finger. On the basis of the detected movement of the fingers in the hovering area 140, the apparatus 100 may be arranged to estimate (virtual) force applied by each finger, add up the estimated forces, and e.g. bend the virtual layer dependent on the combined force. Features illustrated above, e.g. in connection with FIGS. 3, 4, and 8, may be applied separately for each detected finger or a combination of fingers.

As a further example, the size of detected hovering area may be applied to affect controlling 330 the display operations. In a still further example, the apparatus 100 is arranged to detect the direction of movement of the object 1 in the hovering area 140, i.e. hovering direction. The hovering direction may affect control 330 of the display operations for the associated virtual layer(s). It is to be appreciated that two or more of the above-illustrated example conditions may be used to influence the display operations. For example, speed of movement and amount of fingers may be considered in block 330.

In addition to the already above illustrated embodiments, a broad range of further functions is available for selection to be associated with an input detected by a touch sensitive detection system and/or the proximity detection system 120. The controller 130 may be configured to adapt the associations according to a current operating state of the apparatus 100, a user input or an application executed in the apparatus 100, for instance. For instance, associations may be application specific, menu specific, view specific and/or context (which may be defined on the basis of information obtained from the current environment or usage of the apparatus 100) specific.

Figure 15:
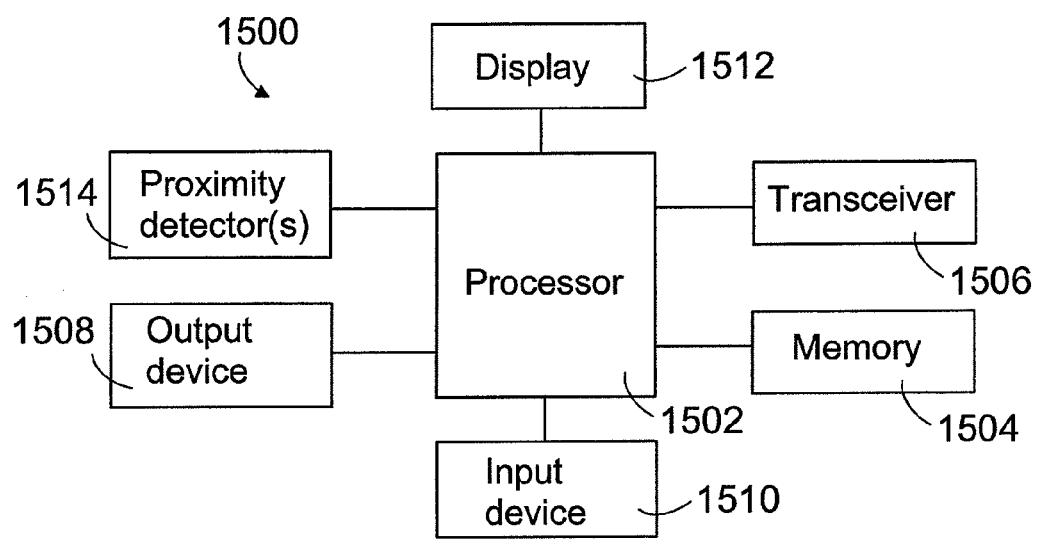
FIG. 15 illustrates an electronic device in accordance with an example embodiment of the invention.

FIG. 15 shows a block diagram of the structure of an electronic device 1500 according to an example embodiment. The electronic device may comprise the apparatus 100. Although one embodiment of the electronic device 1500 is illustrated and will be hereinafter described for purposes of example, other types of electronic devices, such as, but not limited to, PDAs, pagers, mobile computers, desktop computers, laptop computers, tablet computers, media players, televisions, gaming devices, cameras, video recorders, positioning devices, electronic books, wearable devices, projector devices, touch surfaces, touch enabled walls, and other types of electronic systems, may employ the present embodiments.

Furthermore, the apparatus of an example embodiment need not be the entire electronic device, but may be a component or group of components of the electronic device in other example embodiments. For example, the apparatus could be in a form of a chipset or some other kind of hardware module for controlling by performing at least some of the functions illustrated above, such as the functions of the controller 130 of FIG. 2. A processor 1502 is configured to execute instructions and to carry out operations associated with the electronic device 1500. The processor 1502 may comprise means, such as a digital signal processor device, a microprocessor device, and further circuitry, for performing various functions including, for example, one or more of the functions described in conjunction with FIGS. 1 to 14. The processor 1502 may control the reception and processing of input and output data between components of the electronic device 1500 by using instructions retrieved from memory. The processor 1502 can be implemented on a single-chip, multiple chips or multiple electrical components. Some examples of architectures which can be used for the processor 1502 include dedicated or embedded processor, and ASIC. For simplicity, the processor 1502 is illustrated in FIG. 15 as a single block, but it will be appreciated that the electronic device 1500 may comprise a plurality of control sub-systems, such as one or more of an I/O sub-system, an application processing sub-system and communications protocol processing sub-system, each of which may comprise one or more controllers.

The processor 1502 may comprise functionality to operate one or more computer programs. Computer program code may be stored in a memory 1504. The at least one memory and the computer program code may be configured to, with the at least one processor, cause the apparatus to perform at least one embodiment including, for example, control of one or more of the functions described in conjunction with FIGS. 1 to 14. For example, the processor 1502 may be arranged to perform at least part of the functions of the controller 130 of FIG. 2. Typically the processor 1502 operates together with an operating system to execute computer code and produce and use data.

By way of example, the memory 1504 may include non-volatile portion, such as EEPROM, flash memory or the like, and a volatile portion, such as a random access memory (RAM) including a cache area for temporary storage of data. Information for controlling the functionality of the processor 802 could also reside on a removable storage medium and loaded or installed onto the electronic device 1500 when needed.

The electronic device 1500 may comprise an antenna (or multiple antennae) in operable communication with a transceiver unit 1506 comprising a transmitter and a receiver. The electronic device 1500 may operate with one or more air interface standards and communication protocols. By way of illustration, the electronic device 1500 may operate in accordance with any of a number of first, second, third and/or fourth-generation communication protocols or the like. For example, the electronic device 1500 may operate in accordance with wireline protocols, such as Ethernet and digital subscriber line (DSL), with second-generation (2G) wireless communication protocols, such as Global System for Mobile communications (GSM), with third-generation (3G) wireless communication protocols, such as 3G protocols by the Third Generation Partnership Project (3GPP), CDMA2000, wideband CDMA (WCDMA) and time division-synchronous CDMA (TD-SCDMA), with fourth-generation (4G) wireless communication protocols, such as 3GPP Long Term Evolution (LTE), wireless local area networking protocols, such as 802.11, short-range wireless protocols, such as Bluetooth, and/or the like.

The user interface of the electronic device 1500 may comprise an output device 1508, such as a speaker, one or more input devices 1510, such as a microphone, a keypad or one or more buttons or actuators, and a display device 1512 appropriate for the electronic device 1500 in question.

The input device 1510 may include a touch sensing device configured to receive input from a user's touch and to send this information to the processor 1502. Such touch sensing device may be configured to recognize also the position and magnitude of touches on a touch sensitive surface. The touch sensing device may be based on sensing technologies including, but not limited to, capacitive sensing, resistive sensing, surface acoustic wave sensing, pressure sensing, inductive sensing, and optical sensing. Furthermore, the touch sensing device may be based on single point sensing or multipoint sensing. In one embodiment the input device is a touch screen, which is positioned in front of the display 1512.

The electronic device 1500 also comprises a proximity detection system 1514 with proximity detector(s), such as the system 120 illustrated earlier, operatively coupled to the processor 1502. The proximity detection system 1514 is configured to detect when a finger, stylus or other pointing device is in close proximity to, but not in contact with, some component of the computer system including for example housing or I/O devices, such as the touch screen.

The electronic device 1500 may comprise also further units and elements not illustrated in FIG. 15, such as further interface devices, further sensors (e.g. an accelerometer sensor), a battery, a media capturing element, such as a camera, video and/or audio module, a positioning unit, and a user identity module.

In some embodiments further outputs, such as an audible and/or tactile output may also be produced by the apparatus 100 e.g. on the basis of the detected hovering input. Thus, the processor 1502 may be arranged to control a speaker and/or a tactile output actuator, such as a vibration motor, in the electronic device 1500 to provide such further output.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 15. A computer-readable medium may comprise a tangible and non-transitory computer-readable storage medium that may be any media or means that can contain or store the instructions for use by or in connection with an instruction execution system, apparatus, or device, such as a computer.

In one example embodiment, there may be provided circuitry or user interface circuitry configured to provide at least some control functions illustrated above. As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

If desired, at least some of the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory including computer program code,
   the at least one memory and the computer program code configured to, with the at least one processor, cause the apparatus at least to:
   detect presence of an object in close proximity to an input surface,
   determine a virtual layer displayed in a three-dimensional mode currently associated with the object on the basis of distance of the object to the input surface,
   detect a hovering input by the object, wherein the hovering input comprises a change in distance of the object from the input surface,
   cause a display operation to move at least a portion of the associated virtual layer in accordance with the detected hovering input, wherein the at least a portion of the associated virtual layer appears to move with the object such that the distance of the at least a portion of the associated virtual layer to the input surface changes in accordance with the change in distance of the object from the input surface, and
   in an instance in which the object touches the surface during the detected hovering input, cause the associated virtual layer to be displayed in a two-dimensional mode.

2. The apparatus of claim 1, wherein the at least one memory and the computer program code are configured to, with the at least one processor, cause the apparatus at least to cause a change of display mode from the three-dimensional mode to the two-dimensional mode on the basis of detecting the hovering object to select the entire virtual layer and detecting the object to touch the input surface after the selection of the virtual layer.

3. The apparatus of claim 1, wherein the at least one memory and the computer program code are further configured to, with the at least one processor, cause the apparatus at least to detect the lateral position of the object in x, y directions parallel to the input surface, and
   control the movement of the at least a portion of the virtual layer in accordance with the detected lateral position.

4. The apparatus of claim 3, wherein the at least one memory and the computer program code are further configured to, with the at least one processor, cause the apparatus at least to cause a tilt operation for the virtual layer on the basis of the detected lateral position of the object.

5. The apparatus of claim 1, wherein the at least one memory and the computer program code are further configured to, with the at least one processor, cause the apparatus at least to detect speed of movement of the object, and select the display operation for the virtual layer in accordance with the detected speed.

6. The apparatus of claim 1, wherein the at least one memory and the computer program code are further configured to, with the at least one processor, cause the apparatus at least to determine the virtual layer in response to detecting two or more fingers hovering above the input surface.

7. The apparatus of claim 1, wherein the at least one memory and the computer program code are further configured to, with the at least one processor, cause the apparatus at least to detect the object to virtually touch a portion of the virtual layer, and
   in response to detecting the object to further approach the input surface after detecting the virtual touch, the apparatus is configured to adapt the form of a portion of the virtual layer to mimic a reaction to a pushing object.

8. The apparatus of claim 1, wherein the at least one memory and the computer program code are further configured to, with the at least one processor, cause the apparatus at least to control at least one of the movement or appearance of the at least a portion of the virtual layer in accordance with one or more physical properties associated with the virtual layer or one or more graphical user interface items of the virtual layer.

9. The apparatus of claim 1, wherein the input surface and a display displaying the virtual layers are arranged at opposite sides of a handheld electronic device.

10. The apparatus of claim 1, wherein the apparatus is a mobile communications device comprising a touch screen.

11. The apparatus according to claim 1, wherein the at least one memory and the computer program code are further configured to, with the at least one processor, cause the apparatus at least to:
    in the instance in which the object touches the surface during the detected hovering input, cause the apparatus to display all layers in the two-dimensional mode.

12. A method, comprising:
    detecting presence of an object in close proximity to an input surface,
    determining a virtual layer displayed in a three-dimensional mode currently associated with the object on the basis of distance of the object to the input surface,
    detecting a hovering input by the object, wherein the hovering input comprises a change in distance of the object from the input surface,
    causing a display operation to move at least a portion of the associated virtual layer in accordance with the detected hovering input, wherein the at least a portion of the associated virtual layer appears to move with the object such that the distance of the at least a portion of the associated virtual layer to the input surface changes in accordance with the change in distance of the object from the input surface, and
    in an instance in which the object touches the surface during the detected hovering input, causing the associated virtual layer to be displayed in a two-dimensional mode.

13. The method of claim 12, wherein causing a change of display mode from the three-dimensional mode to the two-dimensional mode is performed on the basis of detecting the hovering object to select the entire virtual layer and detecting the object to touch the input surface after the selection of the virtual layer.

14. The method of claim 12, wherein the lateral position of the object in x, y directions parallel to the input surface is detected, and
the movement of the at least a portion of the virtual layer is controlled in accordance with the detected lateral position.

15. The method of claim 14, wherein a tilt operation for the virtual layer is caused on the basis of the detected lateral position of the object.

16. The method of claim 12, wherein the speed of movement of the object is detected, and
the display operation for the virtual layer is selected in accordance with the detected speed.

17. The method of claim 12, wherein the associated virtual layer and/or the hovering input is detected in response to detecting two or more fingers hovering above the input surface.

18. The method of claim 12, wherein the object is determined to virtually touch a portion of the virtual layer, and
in response to detecting the object to further approach the input surface after detecting the virtual touch, the form of a portion of the virtual layer is adapted to mimic a reaction to a pushing object.

19. The method of claim 12, wherein at least one of the movement or appearance of the at least a portion of the virtual layer is controlled in accordance with one or more physical properties associated with the virtual layer or one or more graphical user interface items of the virtual layer.

20. A computer program product comprising a non-transitory computer-readable medium bearing computer program code embodied therein for use with a computer, the computer program code comprising code for causing the computer to perform:
detect presence of an object in close proximity to an input surface,
determine a virtual layer currently displayed in a three dimensional mode associated with the object on the basis of distance of the object to the input surface,
detect a hovering input by the object, wherein the hovering input comprises a change in distance of the object from the input surface,
cause a display operation to move at least a portion of the associated virtual layer in accordance with the detected hovering input, wherein the at least a portion of the associated virtual layer appears to move with the object such that the distance of the at least a portion of the associated virtual layer to the input surface changes in accordance with the change in distance of the object from the input surface, and
in an instance in which the object touches the surface during the detected hovering input, cause the associated virtual layer to be displayed in a two-dimensional mode.

* * * * *